(12) United States Patent
Yuan

(10) Patent No.: US 6,502,427 B1
(45) Date of Patent: Jan. 7, 2003

(54) METHOD AND APPARATUS FOR CONTROLLING AN OUTSIDE DIAMETER OF A PREFORM BAIT TUBE DURING A GLASS LAYER DEPOSITION PROCESS

(75) Inventor: Michael Z. Yuan, Huntersville, NC (US)

(73) Assignee: Alcatel, Paris (FR)

( * ) Notice: Subject to any disclaimer, the term of this patent is extended or adjusted under 35 U.S.C. 154(b) by 50 days.

(21) Appl. No.: 09/699,386

(22) Filed: Oct. 31, 2000

(51) Int. Cl.$^7$ .............................................. C23C 16/40
(52) U.S. Cl. ............................. 65/377; 45/379; 45/382; 45/417; 427/8; 427/163.2; 427/166
(58) Field of Search ......................... 65/377, 379, 382, 65/417; 427/8, 163.2, 166

(56) References Cited

U.S. PATENT DOCUMENTS

| | | |
|---|---|---|
| 4,217,027 A | 8/1980 | MacChesney et al. |
| 4,280,829 A | 7/1981 | Sheth |
| 4,417,911 A | 11/1983 | Cundy et al. |
| 4,764,398 A | 8/1988 | Croitoru et al. |
| 4,813,989 A | 3/1989 | Uchiyama et al. |
| 4,816,050 A * | 3/1989 | Roba ........................... 65/161 |
| 4,966,614 A | 10/1990 | Van Geelen et al. |
| 5,223,308 A | 6/1993 | Doehler |
| 6,105,396 A * | 8/2000 | Glodis et al. .................. 65/377 |

* cited by examiner

Primary Examiner—Timothy Meeks
(74) Attorney, Agent, or Firm—Sughrue Mion, PLLC

(57) ABSTRACT

A method and apparatus for controlling an outside diameter of a preform bait tube during a glass layer deposition process. The apparatus includes a gas source in communication with an interior of the preform bait tube. A temperature monitor measures a temperature of a hot zone of the preform bait tube and generates a temperature output signal indicative of the measured temperature. A diameter monitor measures the diameter of the hot zone of the preform bait tube and generates a diameter output signal indicative of the measured diameter. A pressure measuring unit measures the pressure in the interior of the preform bait tube and generates a pressure output signal indicative of the measured pressure. A control means receives the temperature output signal, the diameter output signal, and the pressure output signal, and determines a total flow rate by adding together (1) a baseline flow rate associated the measured temperature, and (2) a flow rate adjustment based on the measured diameter and the measured pressure. The control means controls the gas source to output a gas at a flow rate equal to the total flow rate.

15 Claims, 3 Drawing Sheets

METHOD AND APPARATUS FOR CONTROLLING AN OUTSIDE DIAMETER OF A PREFORM BAIT TUBE DURING A GLASS LAYER DEPOSITION PROCESS

FIELD OF THE INVENTION

The present invention relates in general to a method for manufacturing an optical waveguide preform, and more particularly to a method for controlling the outside diameter of a preform bait tube during the deposition of glass layers therein.

BACKGROUND

Optical waveguide preforms have been manufactured using a vapor deposition process in which one or more layers of glass are formed on the inner surface of a glass bait tube. In the vapor deposition process, a reaction mixture flows through the bore of the glass bait tube while heating means such as a gas burner moves longitudinally along the tube to form a moving hot zone within the tube. The reaction mixture reacts in the hot zone to form soot, which flows downstream from the hot zone. At least a portion of the soot deposits on the inner surface of the tube and becomes sintered to form a glass layer. Ordinarily, the coated bait tube has at least two compositional regions: an interior region and an exterior region. The interior region will ultimately form the core of the resultant optical fiber, and the exterior region will form the cladding around the core. The preform is usually collapsed into a smaller diameter preform or preferably into a solid cylindrical mass. The relatively large diameter cylindrical preform is then drawn into a small diameter fiber.

Fibers having out-of-round cores and fibers wherein the core is not concentric with the outer cladding surface incur inordinately high splice losses during the coupling of such fibers. Also, the launching of radiation into an optical fiber and the propagation of the radiation therethrough can be adversely affected by fibers having non-uniform geometries. An optical fiber having the desired geometrical properties of circularity and concentricity can only be obtained from a preform having the same geometry. However, even when a circular bait tube is employed, the resultant preform may posses non-uniformities introduced during the deposition process. With each glass deposition pass of the heating means, the bait tube shrinks by a small amount due to surface tension, and when a burner is employed, the burner gas forces add to the tube shrinkage. Cumulatively, this effect can deform the bait tube geometry, thereby causing it to become out-of-round.

Attempts have been made to overcome the inherent shortcomings associated with vapor deposition processes. In a first approach, pressure slightly in excess of the ambient atmospheric pressure is maintained within the bore of the bait tube. The excess pressure counteracts the tendency for collapse or distortion of the tube during the deposition as a result of the externally applied heat. To effect that result, a restriction is formed in the output end of the bait tube. The resulting restriction of the rate of egress of the gaseous mixture from the tube causes the build-up of sufficient pressure to maintain the circularity of the tube during the deposition process.

In a second approach, a conical exhaust tube and a centrally located conical flow restrictor are disposed at the exhaust end of the bait tube. A monitoring apparatus with a laser beam constantly monitors the outer diameter of the bait tube. A signal from the monitoring apparatus is fed to a controller which adjusts the longitudinal position of the conical stopper within the conical exhaust tube. The internal pressure within the bait tube is controlled by varying the area of the orifice between these two conical members.

In a third approach, the diameter of the bait tube is monitored in the region of the hot zone by a device which provides a signal to gas source. Based on the signal, the gas source introduces a gas flow into a chamber provided at the downstream end of the bait tube to control the pressure within the bait tube. In this way, the outer diameter of the bait tube is maintained at a predetermined value.

In a fourth approach, the pressure in the bait tube is directly measured and fed back to a blower, which introduces a gas flow into a chamber provided at the downstream end of the tube. The gas flow rate introduced by the blower is varied in order to maintain the outer diameter of the tube at a predetermined value.

Although these conventional approaches are generally thought to be acceptable, they are not without shortcomings. Namely, conventional manufacture techniques consider only a single variable (i.e., the internal pressure of the bait tube or, alternatively the diameter of the bait tube) during the deposition process. These single variable monitoring techniques do not, however, provide sufficient accuracy. In addition, a more dynamic control of the preform diameter is desirable during the manufacture process in which the heating means (a burner for example) makes several passes along the length of the bait tube.

SUMMARY OF THE INVENTION

The present invention reside in a method for controlling the outside diameter of a preform bait tube during a glass layer deposition process. The method involves determining a total flow rate by adding together a baseline flow rate and a flow rate adjustment. The baseline flow rate is determined from a measured temperature of a hot zone of the preform bait tube. The flow rate adjustment is determined by summing three numbers $N_1$, $N_2$, $N_3$. $N_1$ is equal to a measured diameter of the preform bait tube times a diameter constant. $N_2$ is equal to a measured pressure of an interior of the preform bait tube times a pressure constant. And $N_3$ is equal to an integrated diameter error times an integration constant. Finally, a gas is output at the total flow rate into one of (1) a pressure chamber that is in communication with the interior of the preform bait tube and (2) the interior of the preform bait tube.

The present invention also resides in an apparatus for controlling the outside diameter of a preform bait tube during a glass layer deposition process. The apparatus includes a gas source in communication with an interior of the preform bait tube, a temperature monitor that measures a temperature of a hot zone of the preform bait tube and generates a temperature output signal indicative of the measured temperature, a diameter monitor that measures the diameter of the hot zone of the preform bait tube and generates a diameter output signal indicative of the measured diameter, and a pressure measuring unit that measure the pressure in the interior of the preform bait tube and generates a pressure output signal indicative of the measured pressure. A control means receives the temperature output signal, the diameter output signal, and the pressure output signal, and determines a total flow rate by adding together (1) a baseline flow rate associated the measured temperature, and (2) a flow rate adjustment based on the measured diameter and the measured pressure. The control means controls the gas source to output a gas at a flow rate equal to the total flow rate.

The above and other features of the invention including various and novel details of process steps and construction will now be more particularly described with reference to the accompanying drawings and pointed out in the claims. It will be understood that the particular method and apparatus for controlling the outer diameter of the preform bait tube is shown by way of illustration only and not as a limitation of the invention. The principles and features of this invention may be employed in varied and numerous embodiments without departing from the scope of the invention.

DETAILED DESCRIPTION OF THE INVENTION

Figure 1:
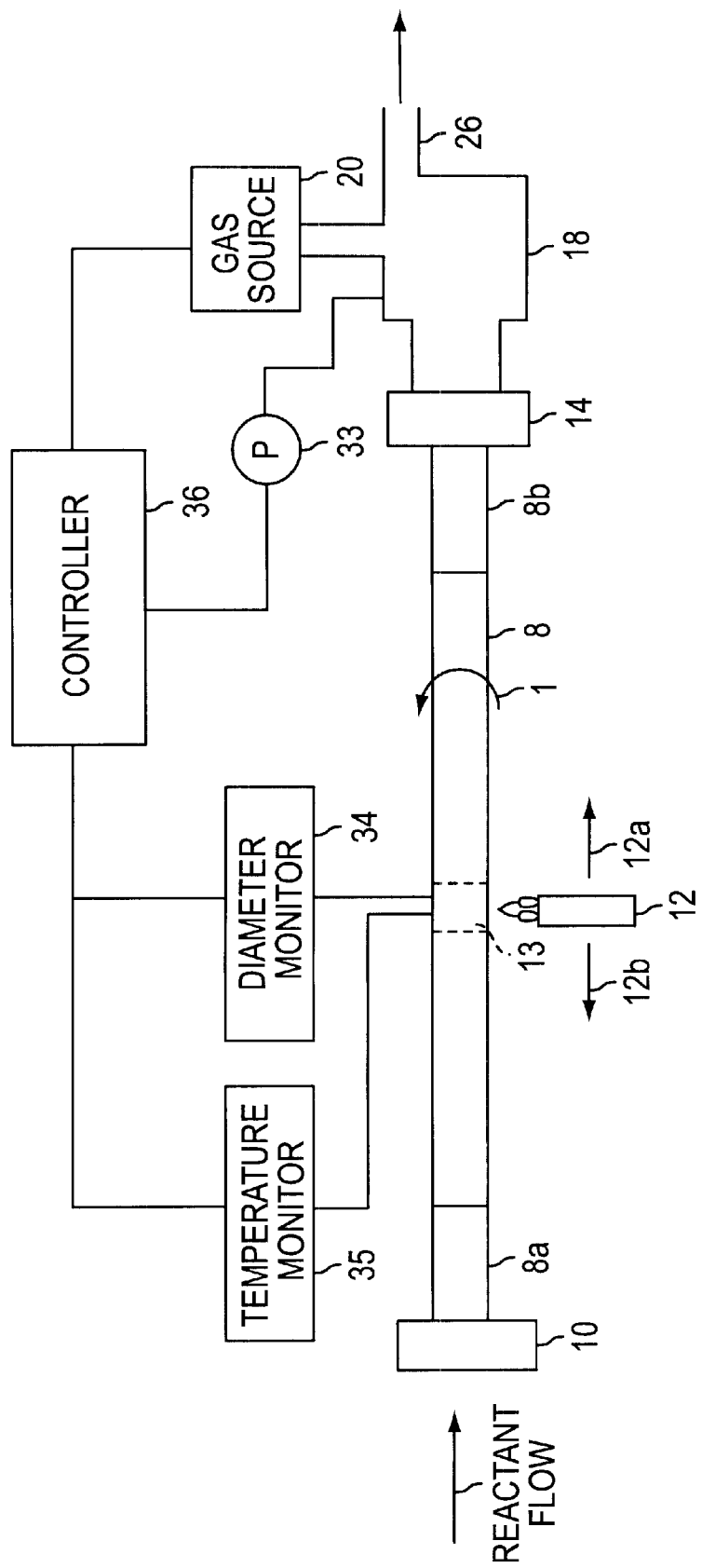
FIG. 1 is a schematic drawing of an apparatus according to an embodiment of the present invention.

FIG. 1 is a schematic representation of an apparatus by means of which the present invention may be practiced. The apparatus includes couplings 10, 14 that rotatably support a bait tube 8. The bait tube 8 has a handle tube 8a supported by the coupling 10 and an exhaust tube 8b supported by the coupling 14. The bait tube 8 is rotated as indicated by the arrow 1. The handle tube 8a, which may be omitted, is an inexpensive glass tube having the same diameter as the bait tube 8, and it does not form a part of the resultant optical waveguide.

A hot zone 13 traverses the bait tube 8 via heating means 12 that moves as indicated by arrows 12a, 12b. The heating means 12 may be any suitable source of heat such as a plurality of burners encircling tube 8. However, since the particular heat source is not critical to the practice of this invention, any appropriate source may be utilized, e.g., an electric resistive heat source, an oven, or the like. The burner 12 initially moves at a low rate of speed relative to the bait tube 8 in the direction of the arrow 12a, the same direction as the reactant flow. The reactants react in the hot zone 13 to produce soot, i.e., a powdery suspension of particulate material, which is carried downstream by moving gas. At least a portion of the soot deposits on the inner surface of the bait tube 8, particularly in the region immediately adjacent to the hot zone 13. As the burner 12 continues to move in the direction of the arrow 12a, the hot zone 13 moves downstream so that a part of the soot buildup extends into the hot zone 13 and is consolidated to form a unitary, homogeneous glassy layer. Process parameters such as temperatures, flow rates, reactants and the like depend on the desired characteristics of the preform. These parameters are well known in the relevant art, and therefore a detailed description of the same will not be provided.

When the burner 12 reaches the end of the bait tube 8 adjacent to the exhaust tube 8b, the temperature of the flame is reduced and the burner 12 returns in the direction of the arrow 12b to the input end of the bait tube 8. Thereafter, additional layers of glassy material are deposited within the bait tube 8 in the manner described above.

After suitable layers have been deposited to serve as the core material and any other desired layers of the resultant optical fiber waveguide, the temperature of the glass is increased to cause the bait tube 8 to collapse. This can be accomplished by reducing the traverse rate of the hot zone 13. The resultant preform is then drawn in accordance with well-known techniques to form an optical waveguide filament having the desired diameter.

The exhaust tube 8b is connected by way of the coupling 14 to a pressure chamber 18, which is in turn connected to a gas source 20. The gas source 20 supplies an inert gas, such as oxygen or nitrogen to the pressure chamber 18. Any inert gas may be used, so long as it does not adversely affect the reaction in the bait tube 8. The exhaust gases from the bait tube 8 and the gas flowing from the gas source 20 are exhausted through a conduit 26 extending from the pressure chamber 18. The pressure inside the pressure chamber 18, which is indicative of the pressure inside the bait tube 8, is measured by a pressure measuring unit 33. The pressure measuring unit 33 generates a pressure output signal to a controller 36. Pressure measuring units are well known in this art, and therefor a detailed description of the same is omitted.

The diameter of the bait tube 8 is measured in the region of the hot zone 13 by a diameter monitor 34, which may consist of a camera containing a photodiode array and its associated electronics. The diameter monitor 34 generates a diameter output signal to the controller 36. Diameter monitors are well known in this art, and therefor a detailed description of the same is omitted.

The temperature of the bait tube 8 is measured in the region of the hot zone 13 by a temperature monitor 35. The temperature monitor 35 generates a temperature output signal to the controller 36. Temperature monitors are well known in this art, and therefor a detailed description of the same is omitted.

The controller 36 receives and manipulates the three inputs, i.e., the pressure output signal, the diameter output signal, and the temperature output signal, to regulate the total flow rate of gas from the gas source 20, thereby accurately controlling the diameter of the bait tube 8. The total flow rate is determined by the following equation:

$u = u_o + \Delta u$, where u is the total flow rate from the gas source 20;

$u_o$ is a base line flow rate; and $\Delta u$ is a flow rate adjustment.

The baseline flow rate $u_o$ is determined from the temperature output signal (which indicates the measured temperature) from the temperature monitor 35. The baseline flow rate $u_o$ is retrieved from a table stored in the controller 36. The table sets forth baseline flow rates $u_o$ for a range of temperatures in the hot zone 13. The base line flow rate $u_o$ is the flow rate of the gas from the gas source 20 which would achieve a desired bait tube diameter in an ideal situation. But the ideal situation is practically unattainable due to inherent variations in equipment, materials, operating environment, etc. The table may be derived experimentally. For example, during the fabrication of a particular type of preform, the actual gas flow rate that produces the desired bait tube diameter at a particular temperature is monitored. At the particular temperature, a number of gas flow rates will achieve the desired tube diameter due to the inherent variations in equipment, materials, and environment. The monitored gas flow rates are then averaged to approximate the gas flow rate in an ideal situation. The approximated gas flow rate is the base line flow rate $u_o$.

Since the ideal situation is practically unattainable, the base line flow rate $u_o$ must be adjusted via the flow rate adjustment Δu. The flow rate adjustment Δu is the sum of three numbers $N_1$, $N_2$, $N_3$, which have the same unit of measure as the baseline flow rate $u_o$ (for example liters/minute). $N_1$ is associated with the diameter output signal (which indicates the measured diameter) from the diameter monitor 34; $N_2$ is associated with the pressure output signal (which indicates the measured pressure) from the pressure measuring unit 33; and $N_3$ is associated with an integrated diameter error. More specifically, the three numbers $N_1$, $N_2$, $N_3$, are calculated as follows:

$N_1$=(measured diameter)×($K_D$);

$N_2$=(measured pressure)×($K_P$); and $N_3$=(integrated diameter error)×($K_1$).

$K_D$, $K_P$, and $K_1$ are constants that represent controller gains. They are unit-less design parameters that are set according to the desired performance of the controller 36. For example, if $K_D$ is set to a large absolute value, then $N_1$ will cause a corresponding large change in the flow rate adjustment Δu. Accordingly, the controller 36 will respond more sensitively to the measured diameter.

The numbers $N_1$ and $N_2$ are referred to as proportional feedback because they are linear proportional to the measured variables (i.e., diameter and pressure, respectively). Accordingly, an increase in the measured variables results in a proportional change in the numbers $N_1$, $N_2$. And if the constants $K_D$, $K_P$ are increased in absolute value (for example, from one burner pass to a successive burner pass), then the numbers $N_1$, $N_2$ will drive the diameter error of the bait tube 8 to zero faster. In some cases, the proportional feedback $N_1$, $N_2$ is essential for completely eliminating the diameter error.

The number $N_3$ is referred to as an integral feedback. It provides a finite control value, even if no diameter error is present at a particular time. This comes about because the integral feedback is a cumulative value. It is a function of past diameter error values as well as a current diameter error value. In this respect, the past diameter errors "charge up" the integral feedback $N_3$ to some value that may remain, even if the current diameter error becomes zero.

Figure 2:
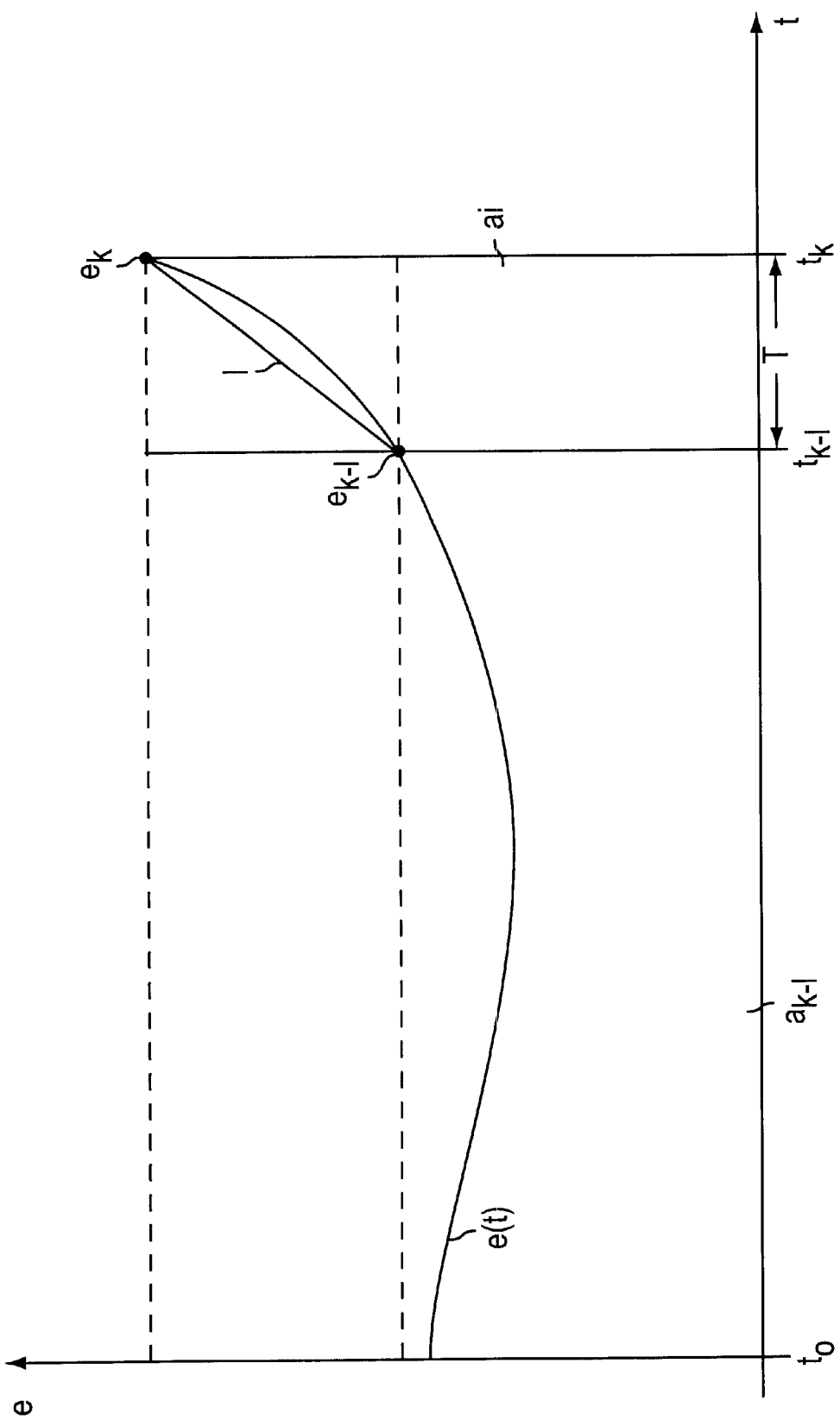
FIG. 2 illustrates a diameter error with respect to time.

The integral feedback $N_3$ is based on an integrated diameter error. The integrated diameter error is an approximation of the area under a diameter error curve. FIG. 2 illustrates a segment of an exemplary diameter error curve e(t). The diameter error e at a particular time t is equal to a desired diameter minus the measured diameter from the diameter monitor 34. The area under he diameter error curve e(t) is equal to the integral $J=\int_o^t e(t)dt$. This area may be approximated by considering discrete values of the diameter error e (e.g., $e(t_0)$, $e(t_{k-1})$, $e(t_k)$, etc.), which are preferably taken at a constant sampling period T (i.e., $t_k - t_{k-1} = T$, $t_{k+1} - t_k = T$, etc.). The sampling period may be on the order of milliseconds.

The area approximation calculation will be better appreciated by considering the diameter error curve e(t) in FIG. 2 at the time $t_k$. At the time $t_k$, the approximate area $\alpha_k = \alpha_{k-1} + \alpha_i$. In this calculation, $\alpha_{k-1}$ is the area under the curve from $t_0$ to $t_{k-1}$, which was previously approximated. Therefore, the area $\alpha_k$ can be approximated by finding an approximation of the incremental area $a_i$ under the curve between $t_{k-1}$ and $t_k$, (i.e., the last sampling period T).

There are at least three alternative techniques for approximating the incremental area $a_i$. Two of the techniques involve calculating the area of a rectangle. The width of the rectangle in both is equal to the sampling period T. The height of the rectangle is taken as either (1) $e_{k-1}$ (the first technique), or (2) $e_k$ (the second technique). In the curve e(t) shown in FIG. 2, the first rectangle technique would result in an under estimation (i.e., the portion of the area $a_i$ above the height $e_{k-1}$ would not be included), and the second rectangle technique would result in an over estimation (i.e., the entire area below $e_k$ and between $t_{k-1}$ and $t_k$ would be included). The third technique involves calculating the area of the trapezoid formed by connecting the points ($t_{k-1}$, $e_{k-1}$) and ($t_k$, $e_k$) by a straight line l. The area of the thus formed trapezoid is equal to $T/2(e_k+e_{k-1})$. Therefore, using the trapezoid technique, the area $\alpha_k = \alpha_{k-1} + T/2(e_k+e_{k-1})$. The above process is performed at each discrete sampling period T, so that the total area $\alpha_k$ under the curve e(t) is accumulated over time.

It is to be appreciated that the cumulative effect of these approximations may increase, as well as decrease, the total area $\alpha_k$ under the curve e(t). In fact, the integrated diameter error may even have a negative value. For example, if the diameter error curve e(t) is below the horizontal time axis in FIG. 2, then the integrated diameter error would have a negative value (assuming that the upper right quadrant has positive values for both the diameter error and time coordinates).

Preferably, the constants $K_D$ and $K_P$ (which are associated with the numbers $N_1$ and $N_2$, respectively) are negative values. Consider the measured pressure for example. An increase in the measured pressure (which would indicate an increased bait tube diameter) would result in a decreased negative value for the number $N_2$. The lower $N_2$ value would diminish the flow rate adjustment Δu, which would tend to cause a decrease in the bait tube diameter.

Given the coordinate scheme noted above with respect to FIG. 2, the constant $K_1$ would preferably have a positive value. That is, through time t(k) in FIG. 2, the desired diameter is greater than the measured diameter, which results in a positive value for the integrated diameter error. With a positive value for the constant $K_1$, the number $N_3$ would also have a positive value. This positive $N_3$ value would increase the flow rate adjustment Δu, which would tend to cause the bait tube diameter to increase toward the desired value.

Figure 3:
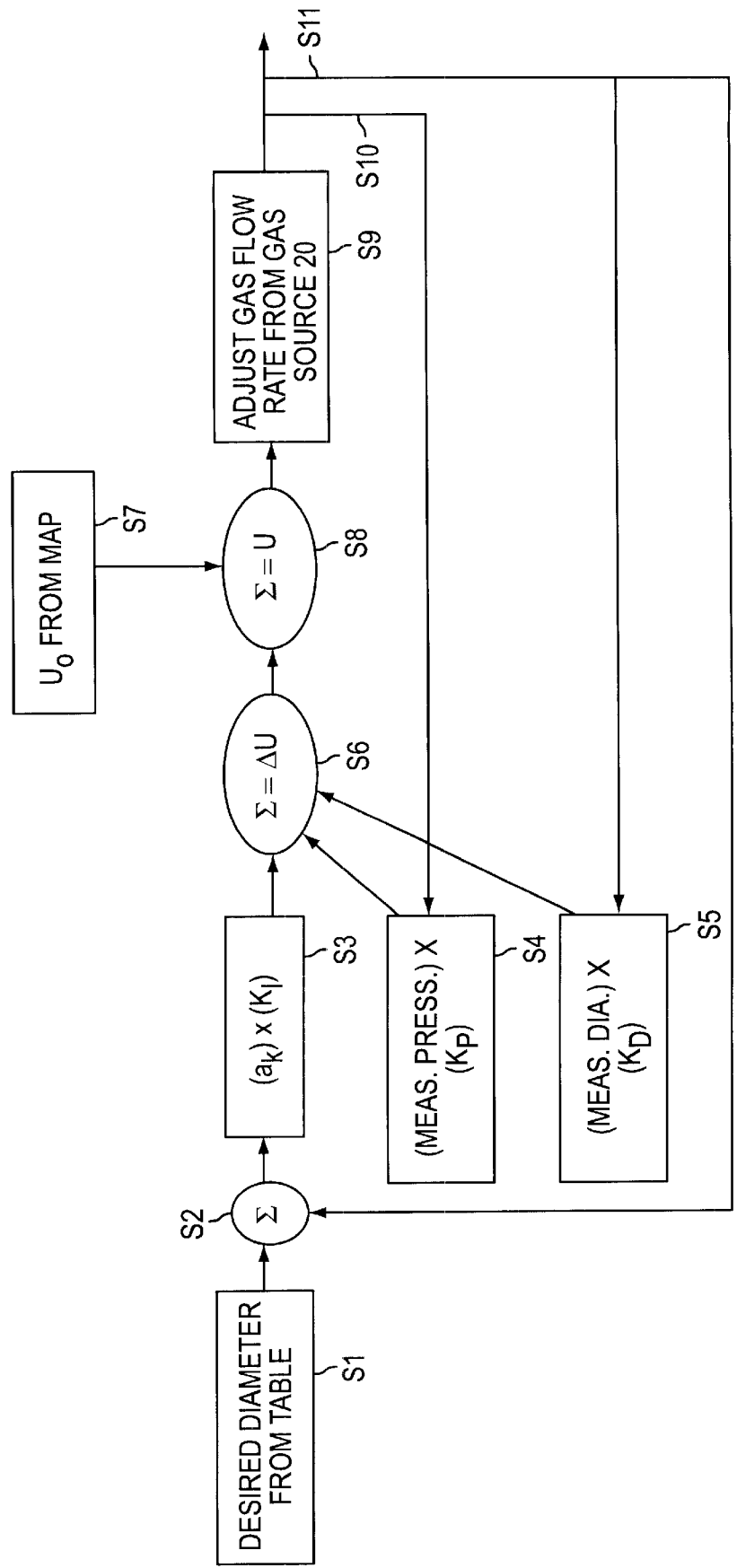
FIG. 3 shows the process steps performed by the controller shown in FIG. 1.

FIG. 3 schematically illustrates the steps preformed by the controller 36 to determine the total flow rate u of gas from the gas source 20. At Step S1, the desired diameter is retrieved from a table in the controller 36. The desired diameter depends on the specific type of preform being manufactured and the specific process step being performed. The desired diameter may vary during the manufacture process. For example, the desired diameter may be a first value during an initial pass of the burner 12, and a second value during a subsequent pass of the burner 12. The desired diameter is the diameter that would exist during an ideal manufacture process.

At Step S2, the measured diameter (i.e., the diameter output signal from the diameter monitor 34, Step S11) is subtracted from the desired diameter to obtain a current diameter error $e_k$.

At Step S3, the integrated diameter error is approximated. That is, the incremental area $\alpha_i$ is approximated and then added to a previously approximated area $\alpha_{k-1}$ to determine the cumulative area $\alpha_k$. The cumulative area $\alpha_k$ is then multiplied by the constant $K_1$. The result is the number $N_3$.

At Step S4, the measured pressure (i.e., the pressure output signal from the pressure measuring unit 33, Step S10) is multiplied by the constant $K_P$. The result is the number $N_2$.

At Step S5, the measured diameter (i.e., the diameter output signal from the diameter monitor 34, Step S11) is multiplied by the constant $K_D$. The result is the number $N_1$.

At Step S6, the flow rate adjustment $\Delta u$ is calculated by summing the three number $N_1$, $N_2$, $N_3$.

At Step S7, the base line flow rate $u_o$ is retrieved from the map based on the measured temperature (i.e., the temperature output signal from the temperature monitor 34).

At Step S8, the total flow rate u is calculated by summing the base line flow rate $u_o$ (Step S7) and the flow rate adjustment $\Delta u$ (Step S6).

At Step S9, the controller 36 sets the flow rate of gas from the gas source 20 to the total flow rate u.

It is to be appreciated that the above described process occurs periodically as the burner traverses along the length of the bait tube. The discrete calculations may be performed in rapid succession (i.e., on the order of milliseconds) to improve dynamic control.

According to the present method, the diameter of the bait tube 8 is controlled by considering the temperature, diameter, and pressure. This three variable monitoring technique provides enhanced accuracy with respect to bait tube characteristics, especially the bait tube's diameter. Moreover this monitoring technique provides a more dynamic control in the sense that the bait tube's diameter can be adjusted between successive burner passes along the length of the bait tube, and even within a single burner pass.

What is claimed is:

1. A method of controlling an outside diameter of a preform bait tube during a glass layer deposition process, the method comprising the steps of:
   determining a baseline flow rate that corresponds to a temperature of the preform bait tube;
   determining a flow rate adjustment from (1) a diameter of the preform bait tube and (2) a measured pressure of an interior of the preform bait tube multiplied by a pressure constant;
   determining a total flow rate by summing the baseline flow rate and the flow rate adjustment; and
   flowing a gas at the total flow rate into one of (1) a pressure chamber that is in communication with the interior of the preform bait tube and (2) the interior of the preform bait tube.

2. The method according to claim 1, further comprising the steps of:
   measuring the temperature of a hot zone of the preform bait tube; and
   using the measured temperature to determine the baseline flow rate.

3. The method according to claim 2, further comprising the step of:
   retrieving the baseline flow rate from a table containing baseline flow rates that respectively correspond to temperatures in the hot zone of the preform bait tube.

4. The method according to claim 1, further comprising the step of:
   measuring a diameter of the preform bait tube using a camera; and
   using the measured diameter to determine the flow rate adjustment.

5. The method according to claim 4, wherein the diameter is measured in a hot zone of the preform bait tube.

6. The method according to claim 5, wherein the flow rate adjustment is determined by
   multiplying the measured diameter times a diameter constant to obtain a diameter variable;
   multiplying an integrated diameter error times an integration constant to obtain a diameter error variable; and
   summing the diameter variable and the diameter error variable.

7. The method according to claim 6, wherein the integrated diameter error is calculated by
   approximating an incremental area under a diameter error curve; and
   adding the approximated incremental area to a previously approximated cumulative area under the diameter error curve.

8. The method according to claim 1, further comprising the step of:
   measuring the pressure of the preform bait tube using a pressure measuring unit.

9. A method of controlling an outside diameter of a preform bait tube during a glass layer deposition process, the method comprising the steps of:
   determining a baseline flow rate that corresponds to a measured temperature of a hot zone of the preform bait tube;
   determining a flow rate adjustment by summing three numbers $N_1$, $N_2$, $N_3$, where
   (1) $N_1$=(a measured diameter of the preform bait tube)×(a diameter constant),
   (2) $N_2$ =(a measured pressure of an interior of the preform bait tube)×(a pressure constant), and
   (3) $N_3$ =(an integrated diameter error)×(an integration constant);
   determining a total flow rate by summing the baseline flow rate and the flow rate adjustment; and
   flowing a gas at the total flow rate into one of (1) a pressure chamber that is in communication with the interior of the preform bait tube and (2) the interior of the preform bait tube.

10. The method according to claim 9, further comprising the steps of:
    measuring the temperature of the hot zone of the preform bait tube using a temperature monitor;
    measuring the diameter of the preform bait tube using a camera; and
    measuring the pressure of the interior of the preform bait tube using a pressure measuring unit.

11. The method according to claim 10, wherein the integrated diameter error is calculated by
    approximating an incremental area under a diameter error curve; and
    adding the approximated incremental area to a previously approximated cumulative area under the diameter error curve.

12. The method according to claim 11, wherein the diameter error curve is obtained by subtracting the measured diameter from a desired diameter.

13. A method of controlling an outside diameter of a preform bait tube during a glass layer deposition process, the method comprising the steps of:
    determining a baseline flow rate that corresponds to a temperature of the preform bait tube;
    determining a flow rate adjustment from (1) a diameter of the preform bait tube and (2) a pressure of an interior of the preform bait tube;
    determining a total flow rate by summing the baseline flow rate and the flow rate adjustment;
    flowing a gas at the total flow rate into one of (1) a pressure chamber that is in communication with the interior of the preform bait tube and (2) the interior of the preform bait tube;

measuring the temperature of a hot zone of the preform bait tube; and using the measured temperature to determine the baseline flow rate.

14. The method according to claim 13, further comprising the step of:

retrieving the baseline flow rate from a table containing baseline flow rates that respectively correspond to temperatures in the hot zone of the preform bait tube.

15. A method of controlling an outside diameter of a preform bait tube during a glass layer deposition process, the method comprising the steps of:

determining a baseline flow rate;

determining a flow rate adjustment from (1) a diameter of the preform bait tube and (2) a measured pressure of an interior of the preform bait tube multiplied by a pressure constant;

determining a total flow rate by summing the baseline flow rate and the flow rate adjustment; and flowing a gas at the total flow rate into one of (1) a pressure chamber that is in communication with the interior of the preform bait tube and (2) the interior of the preform bait tube.

* * * * *